United States Patent
Machi et al.

(10) Patent No.: US 6,783,260 B2
(45) Date of Patent: Aug. 31, 2004

(54) IR LASER DIODE BASED HIGH INTENSITY LIGHT

(75) Inventors: Nicolo F. Machi, Springfield, OH (US); Nam H. Vo, Marysville, OH (US)

(73) Assignee: Honeywell International Inc., Morristown, NJ (US)

(*) Notice: Subject to any disclaimer, the term of this patent is extended or adjusted under 35 U.S.C. 154(b) by 197 days.

(21) Appl. No.: 09/975,162

(22) Filed: Oct. 11, 2001

(65) Prior Publication Data

US 2002/0074523 A1 Jun. 20, 2002

Related U.S. Application Data

(60) Provisional application No. 60/257,203, filed on Dec. 20, 2000.

(51) Int. Cl.[7] .............................. F21K 27/00; G01J 1/00; H01S 3/04
(52) U.S. Cl. ...................... 362/259; 250/495.1; 372/36
(58) Field of Search ........................... 372/34–36, 109, 372/43; 250/495.1; 362/217–225, 259, 158, 183, 241

(56) References Cited

U.S. PATENT DOCUMENTS

| | | | |
|---|---|---|---|
| 4,151,584 A | * | 4/1979 | Labrum ........................ 362/302 |
| 4,637,025 A | | 1/1987 | Snitzer et al. .................. 372/1 |
| 4,826,269 A | | 5/1989 | Streifer et al. .............. 350/3.72 |
| RE33,572 E | | 4/1991 | Meyers ........................ 250/504 |
| 5,309,277 A | | 5/1994 | Deck ........................... 359/387 |
| 5,317,447 A | * | 5/1994 | Baird et al. .................. 359/328 |
| 5,317,452 A | | 5/1994 | Prentiss et al. ............. 359/819 |
| 5,541,947 A | | 7/1996 | Mourou et al. ............... 372/25 |
| 5,595,435 A | * | 1/1997 | Palmer et al. ............... 362/109 |
| 5,685,636 A | * | 11/1997 | German ....................... 362/259 |
| 5,701,015 A | * | 12/1997 | Lungershausen et al. 250/495.1 |
| 5,713,654 A | | 2/1998 | Scifres ......................... 362/80 |
| 5,997,163 A | | 12/1999 | Brown ......................... 362/553 |
| 6,062,702 A | * | 5/2000 | Krietzman ................... 362/158 |
| 6,142,650 A | * | 11/2000 | Brown et al. ................ 362/259 |
| 6,183,105 B1 | * | 2/2001 | Parker ......................... 362/183 |
| 6,196,702 B1 | * | 3/2001 | Krietzman ................... 362/259 |
| 6,350,041 B1 | * | 2/2002 | Tarsa et al. .................. 362/231 |
| 6,609,812 B2 | | 8/2003 | Machi et al. |

* cited by examiner

Primary Examiner—Tan Ho
Assistant Examiner—Phillip Nguyen
(74) Attorney, Agent, or Firm—Larry J. Palguta

(57) ABSTRACT

An infrared LASER diode based high intensity light (100) for use as an aircraft landing light or searchlight in conjunction with night vision imaging systems. The high intensity light (100) uses infrared LASER diodes (110) installed into a heat sink (112) for temperature stability. The infrared light emitted from the LASER diodes (110) is transmitted to an optical positioning plate (106) by optical transmission means (108). The optical positioning plate (106) combines the emissions of the individual LASER diodes (110) to a single infrared light beam, which is collimated by an aspheric lens (102).

24 Claims, 2 Drawing Sheets

IR LASER DIODE BASED HIGH INTENSITY LIGHT

This application claims the benefit of U.S. Provisional Application No. 60/257,203 filed Dec. 20, 2000 entitled IR LASER DIODE BASED HIGH INTENSITY LIGHT.

BACKGROUND OF THE INVENTION

1. Field of the Invention

This invention relates to an infrared light designed for use with infrared imaging equipment. Specifically, this invention relates to a high intensity light for use on aircraft or other vehicles and utilizes infrared ("IR") LASER diodes.

2. Description of the Related Art

Military and law enforcement personnel regularly use night vision imaging systems ("NVIS") to support covert operations. NVIS systems utilize infrared light amplification techniques to allow the user to see terrain, objects, people, and targets in conditions of near total darkness. NVIS equipment is frequently augmented by infrared lighting. The IR lights cast a bright beam of infrared light that extends the viewing area of the NVIS system but cannot be detected by the unaided eye, preserving the covert nature of night vision operations.

Aircraft commonly use landing lights to provide illumination during taxi, take-off, and landing when visibility is reduced by darkness or adverse weather conditions. Similarly, helicopters use searchlights to aim a beam of light in a desired direction to illuminate areas of interest or targets. High intensity IR lights have previously been installed on aircraft for this purpose in conjunction with NVIS equipment, but they suffer from several disadvantages. Prior high intensity IR lights typically use sealed beam or halogen incandescent lamps coupled with a "black glass" filter that blocks visible light while passing infrared light. Such high intensity IR lights generate a substantial amount of heat due to the low efficacy of incandescent lamps and the visible light energy trapped in the lamp housing by the infrared light filter. This condition is made worse by the need to use high-wattage lamps to overcome the inefficiencies of the lamp and filter to achieve the high infrared light output needed for landing lights and searchlights.

The high temperatures generated by prior infrared high intensity lights may have many detrimental effects. For example, the operating life of the incandescent lamps is considerably reduced. In fact, the lab-rated lamp life of some prior incandescent lamp-filter IR high intensity lighting systems may be as low as 50 hours, with an even lower life expectancy in the harsh aircraft environment. This increases the risk of a lamp failure at a critical time during covert operations. The high temperatures can also cause premature failure of other materials, such as cracking of the filter due to thermal stress and accelerated weathering of filter sealing materials. If either the filter or the seal were to fail, high intensity visible light could escape, compromising covertness.

A limitation of incandescent lamp-filter IR high intensity lighting systems is that the high operating temperature increases the thermal signature of the light. If the light's thermal signature is too high, the light may be visible to thermal imaging systems and equipment used by opposing personnel. It should be further noted that the black glass NVIS filter does not filter out all visible frequencies of light. As a result, the prior high intensity IR light may have a visible red glow, also compromising covertness.

As previously noted, the low efficacy of incandescent lamps combined with the low efficiency of IR filters has necessitated the use of high-wattage lamps to overcome these drawbacks. As a result, 200-watt incandescent lamps are commonly used for aircraft landing lights and searchlights, burdening the aircraft's electrical system. Since the prior landing and searchlights are so prone to failure it is common to install two or more lighting systems on the aircraft, further taxing the aircraft's electrical system. Alternative lighting systems have been devised to overcome some of these obstacles. For example, Meyers U.S. Pat. No. Re. 33,572 discloses an infrared light beam projector for use with a night vision system. However, infrared high intensity lights such as those used for aircraft landing lights and searchlights require a much higher level of light than can be achieved through the teachings of Meyers. Laser diodes have been previously used in vehicular applications, such as Scifres U.S. Pat. No. 5,713,654 which discloses a centralized lighting system for vehicular instrument lights, marker lights, and brake lights. However, the high intensity light requirements of landing lights and searchlights obviate use of the teachings of Scifres. A co-owned and pending patent application, U.S. patent application Ser. No. 09/217,221, "IR Diode Based High Intensity Light," offers an alternate means for generating high intensity infrared light. However, application Ser. No. 09/217,221 differs significantly from the present invention. The present invention uses LASER infrared diodes rather than infrared light emitting diodes, resulting in coherent infrared light as opposed to non-coherent infrared light, and includes means for combining infrared light emissions from two or more infrared light sources.

There is a need for a light which provides a beam of high intensity infrared light, has a long operating life, does not generate high temperatures, has a low thermal signature, and operates with reduced power requirements compared to prior IR high intensity lighting systems.

SUMMARY OF THE INVENTION

This invention is directed to a light which provides a beam of high intensity infrared light without the need for resorting to inefficient and power-hungry incandescent lights and "black glass filters."

Specifically, the present invention includes two or more LASER infrared light emitting diodes. "LASER" is an acronym for "light amplification by stimulated emission of radiation." Lasers are used in the creation, amplification, and transmission of a narrow, intense beam of coherent light. The coherent light produced by a laser differs from ordinary light in that it is made up of waves all of the same wavelength and all in phase, whereas ordinary light contains many different wavelengths and phase relations.

If an array of LASER infrared light emitting diodes ("LIDs") is employed, the IR light's intensity will be greater. An array also carries an inherent benefit of redundancy in that the remaining LIDs will continue to operate if one LID should fail, reducing the risk of total failure of the high intensity IR light at a critical time during a covert operation.

The LIDs are mounted to a heat sink for temperature stabilization. The heat sink serves to extend LID life by maintaining the LID's operating temperature within the manufacturer's specification. The infrared light emitted by the LIDs is coupled to an optical transmission means, such as machined or molded light pipes, or preferably optical fibers. An optical positioning plate receives the infrared radiation from the optical transmission means and concentrates the radiation of the individual LIDs into a single beam, providing a "point" source of infrared light. An aspheric lens is situated such that its focal plane is placed at the light emitting surface of the optical positioning plate. The aspheric lens receives the beam of light emitted by the optical positioning plate and collimates the radiation, resulting in a radiant intensity greater than six. A conical reflector, such as a polished aluminum reflector, may optionally be placed between the optical positioning plate and the aspheric lens to further direct the infrared light emitted by the optical positioning plate, resulting in increased light-collection efficiency.

Electrical power is connected to a control circuit that conditions the voltage and current to a level compatible with the LIDs. The control circuit may be mounted inside the housing, or may be located remotely. The control circuit provides sufficient electrical power to activate the LIDs while preventing over-driving of the LIDs.

The high intensity IR light may include a housing to contain internal components of the light. The housing may include mounting points to facilitate installation and mounting of the infrared high intensity light.

The present invention comprises a high intensity infrared light, comprising: a housing; two or more LASER infrared diodes arranged inside said housing; means comprising a heat sink for receiving heat from said LASER infrared diodes; means for collecting and transmitting the infrared light radiated by said LASER infrared diodes; means for receiving and combining the infrared light from said transmitting means into a single beam of infrared light and to radiate the beam of light from a light emitting surface; and an aspheric lens situated such that the focal plane of said aspheric lens is placed at the light emitting surface of said combining means, wherein said aspheric lens is adapted to receive the beam of infrared light emitted by the combining means and to collimate said beam of infrared light.

These and other features will become better understood with reference to the following description, appended claims, and accompanying drawings.

DETAILED DESCRIPTION OF THE INVENTION

Figure 1:
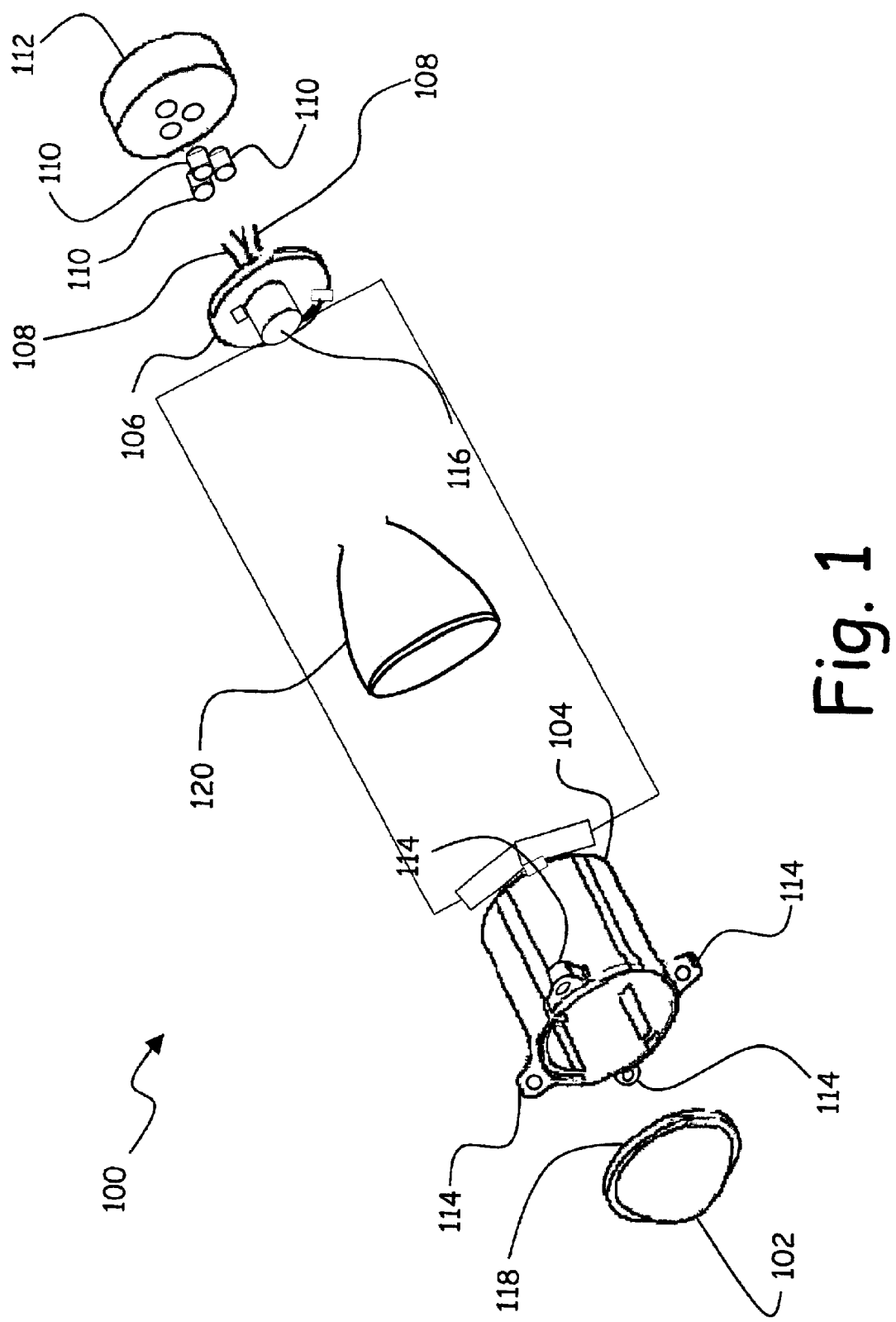
FIG. 1 is a view of the general arrangement of the high intensity IR light.
Figure 2:
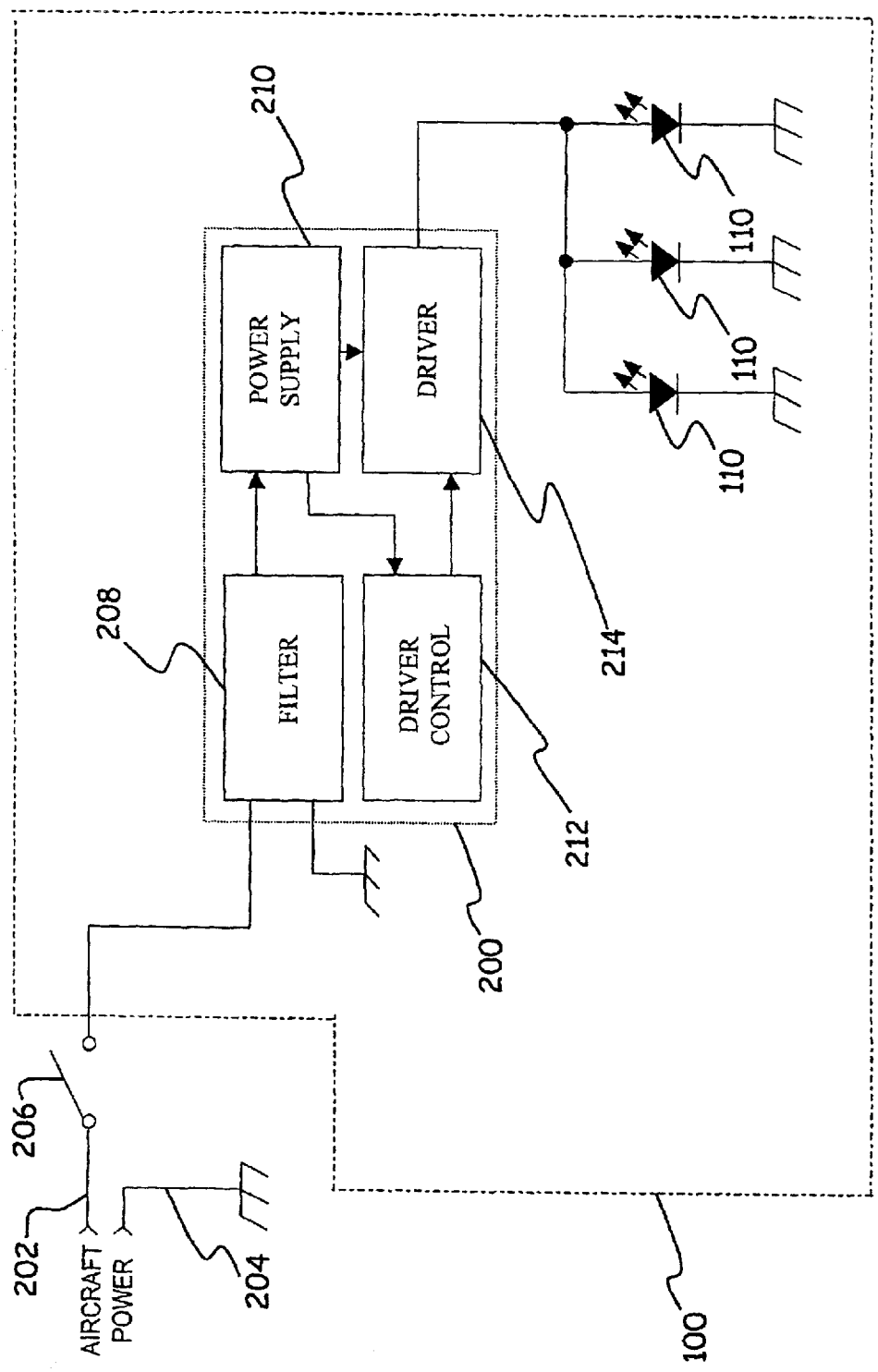
FIG. 2 is an electrical schematic of the high intensity IR light.

The general arrangement of the high intensity infrared light 100 is illustrated in FIG. 1. Two or more LASER infrared diodes (LIDs) 110 are mounted to a heat sink 112 to maintain a stabilized operating temperature for the LIDs 110. The infrared light emitted by LIDs 110 is coupled to a set of optical transmission means such as light pipes or preferably optical fibers 108. The light received by the optical fibers 108 is transmitted to the optical positioning plate 106, and is combined in optical positioning plate 106 to form a single beam of infrared light. An aspheric lens 102 is situated such that its focal plane 118 is placed at the light emitting surface 116 of the optical positioning plate 106. The aspheric lens 102 receives the single beam of light emitted by the optical positioning plate 106 and collimates the beam, providing an NVIS radiant intensity greater than six. A conical reflector 120, such as a polished aluminum reflector, may optionally be placed between the optical positioning plate 106 and the aspheric lens 102 to further direct the infrared light emitted by the optical positioning plate 106.

The components of the high intensity infrared light 100 may be assembled into a housing 104 for protection from the elements. The housing 104 may optionally include mounting points 114 to facilitate searchlight assembly.

A schematic diagram of the electrical circuit for the high intensity IR light 100 is supplied by the power input lines 202, 204. Electrical power is controlled by a switch 206. When switch 206 is closed, voltage is supplied to the high voltage filter 208, which isolates electrical noise between the power source and the control circuit 200. The power supply 210, such as a voltage regulator, conditions the electrical power from the power source to a level suitable for the components in control circuit 200. The driver control 212, upon receiving conditioned power from the power supply 210, activates the driver 214. The driver 214, such as an electrical current limiter, supplies a controlled amount of electrical current to the infrared light sources 110, causing the infrared light sources 110 to emit infrared light.

In operation, the high intensity IR light 100 is mounted to an aircraft for use as a landing light or searchlight. A control switch 206, typically mounted in the cockpit, is initially placed in the "open" position causing electrical power to be removed the infrared light sources 110. When the operator sets control switch 206 to the "closed" position, driver 214 is activated, causing the infrared light sources 110 to emit infrared light to facilitate takeoff, landing, searching, targeting, and maneuvering during covert operations.

Although the present invention has been shown and application, the present invention is not limited to aviation uses. Indeed, the present invention is immediately applicable to hand-held and stationary fixtures as well as all types of vehicular traffic, including automotive, marine, and railroad.

What is claimed is:

1. A high intensity infrared light, comprising:
    a housing;
    two or more LASER infrared diodes arranged inside said housing;
    means comprising a heat sink for receiving heat from said LASER infrared diodes;
    means for collecting and transmitting the infrared light radiated by said LASER infrared diodes;
    means for receiving and combining the infrared light from said optical transmitting means into a single beam of infrared light and to radiate the beam of light from a light emitting surface; and
    a lens situated such that the focal plane of said lens is placed at the light emitting surface of said combining means, wherein said lens is adapted to receive the beam of infrared light emitted by the combining means and to collimate said beam of infrared light.

2. The high intensity infrared light of claim 1, further including means for controlling the electrical power applied to said LASER infrared diodes.

3. The high intensity infrared light of claim 2 wherein said controlling means is either located inside said housing, or remotely located from said housing.

4. The high intensity infrared light of claim 1, further including mounting points on said housing to facilitate installation.

5. The high intensity infrared light of claim 1, further including a conical reflector positioned between said means for receiving and combining infrared light and said lens to further collect and direct the infrared light emitted by said means for receiving and combining infrared light.

6. A high intensity infrared light, comprising:
    a housing, said hoeing including mounting points to facilitate installation;

two or more LASER infrared diodes arranged inside said housing;

means comprising a heat sink for receiving heat from said LASER infrared diodes;

at least two optical transmission means coupled to said LASER infrared diodes and adapted to collect and transmit the infrared light radiated by said LASER infrared diodes;

an optical positioning plate adapted to receive and combine said optical transmissions into a single beam of light and to radiate the beam of light from a light emitting surface;

a lens situated such that the focal plane of said lens is placed at the light emitting surface of said optical positioning plate, said lens adapted to receive the beam of infrared light emitted by the optical positioning plate and to collimate said beam of infrared light; and means for controlling the electrical power applied to said LASER infrared diodes, said means being one of located inside said housing and located remotely from said housing.

7. A process for providing high intensity infrared light, comprising:

providing at least two LASER infrared diodes;

removing heat from said LASER infrared diodes;

transmitting infrared light emitted from said LASER infrared diodes through an optical transmission means;

combining the output of said optical transmission means into a single beam of infrared light;

radiating said beam of infrared light from a light emitting surface;

positioning a lens such that the focal plane of said lens is situated at said light emitting surface; and transmitting the beam of infrared light through said lens, wherein the lens is configured to collimate the transmitted beam of infrared light.

8. A process according to claim 7, further including the step of directing the beam of infrared light combined from the output of said optical transmission means toward said lens.

9. A process according to claim 7 wherein the LASER infrared diodes are conformed within a housing.

10. A process according to claim 9 wherein said housing includes mounting points to facilitate installation.

11. A process according to claim 7 wherein an optical positioning plate is used to combine the output of aid optical transmission means.

12. A process according to claim 7 wherein a heat sink is used to remove the heat from said LASER infrared diodes.

13. A process for providing high intensity infrared light, comprising:

providing at least two LASER infrared diodes;

limiting the electrical power applied to said LASER infrared diodes;

removing heat from said LASER infrared diodes;

transmitting infrared light emitted from said LASER infrared diodes to optical transmission means;

combining the output of said optical transmission means into a single beam of infrared light;

radiating said beam of infrared light from a light emitting surface;

positioning a lens such that the focal plane of said lens is situated at said light emitting surface; and transmitting the beam of infrared light through said lens, wherein the lens is configured to collimate the transmitted beam of infrared light.

14. A process according to claim 13 wherein a control circuit is used to limit the electrical power applied to said LASER infrared diodes.

15. The high intensity infrared light of claim 1, wherein said collecting and transmitting means include two or more optical fibers, each configured to transmit infrared light received from a corresponding one of the two or more LASER infrared diodes, and said receiving and combining means include an optical positioning plate configured to receive and emit the single beam of infrared light, the single beam of infrared light being formed by combining the infrared light transmitted by the two or more optical fibers.

16. The high intensity infrared light of claim 15, wherein the single beam of infrared light emitted by the optical positioning plate is not further expanded before being receive and collimated by the lens.

17. The high intensity infrared light of claim 1, which is mounted on an aircraft assembly, the high intensity infrared light being configured as at least one of a landing light an a searchlight for the aircraft.

18. The high intensity infrared light of claim 1, wherein the lens is an aspheric lens.

19. The high intensity infrared light of claim 6, wherein each of said two optical transmissions means is an optical fiber configured to transmit infrared light received from a corresponding one of the two or more LASER infrared diodes.

20. The high intensity infrared light of claim 6, wherein the single beam of infrared light emitted by the optical positioning plate is not further expanded before being received and collimated by the lens.

21. The high intensity infrared light of claim 6, wherein the lens is an aspheric lens.

22. A process according to claim 7, wherein the beam of infrared light combined from the output of the transmission means is not further expanded before being transmitted through the lens.

23. A process according to claim 7, wherein the lens is an aspheric lens.

24. A process according to claim 13, wherein the lens is an aspheric lens.

* * * * *